US012667923B2

(12) United States Patent
Goodwin et al.

(10) Patent No.: US 12,667,923 B2
(45) Date of Patent: Jun. 30, 2026

(54) SYSTEMS AND METHODS TO SECURE A WORKPIECE TO A MACHINE

(71) Applicants: Derek Evan Goodwin, Gilroy, CA (US); Michael Wayne Whitten, Carson City, NV (US)

(72) Inventors: Derek Evan Goodwin, Gilroy, CA (US); Michael Wayne Whitten, Carson City, NV (US)

(*) Notice: Subject to any disclaimer, the term of this patent is extended or adjusted under 35 U.S.C. 154(b) by 43 days.

(21) Appl. No.: 18/769,268

(22) Filed: Jul. 10, 2024

(65) Prior Publication Data

US 2026/0014657 A1     Jan. 15, 2026

(51) Int. Cl.
*B23Q 3/10* (2006.01)
*B23Q 3/06* (2006.01)

(52) U.S. Cl.
CPC .............. *B23Q 3/10* (2013.01); *B23Q 3/062* (2013.01)

(58) Field of Classification Search
CPC .................................. B23Q 3/10; B23Q 3/062
See application file for complete search history.

(56) References Cited

U.S. PATENT DOCUMENTS 8,672,310 B2 * 3/2014 O'Rell ..................... B23Q 1/42
269/246

* cited by examiner

*Primary Examiner* — Nirvana Deonauth
(74) *Attorney, Agent, or Firm* — PatentPC PowerPatent; Bao Tran

(57) ABSTRACT

Systems and methods are disclosed to secure a workpiece with a recess or a projection on one end of the workpiece. The device includes a base; a body portion having a first end coupled to the base and a second end coupleable to the workpiece via the recess or the projection on one end the workpiece; and one or more fastener openings in the body portion, each fastener opening adapted to receive a fastener, each fastener opening further including a pivot module including a compression spring and a clamp pivot to secure the workpiece to the body portion.

10 Claims, 3 Drawing Sheets

20

200

10

20

200

10

SECTION A-A

COMPONENTS

LOCATING PIN

SECTION B-B

SYSTEMS AND METHODS TO SECURE A WORKPIECE TO A MACHINE

FIELD OF THE INVENTION

The invention relates to tools to secure a workpiece on a machining table.

BACKGROUND

A modern machining center is typically a machine that can be numerically controlled to produce products in a cost-effective manner. Tools can be used to perform continuous milling, drilling and boring.

Traditional machining involves using a turning or milling machine. In subtractive manufacturing methods, a tool rotates at a certain RPM and removes material from a part or workpiece. A milling machine may have 3 to 6 axes. An opposite approach uses a turning machine where the workpiece turns about an axis, while the tool stays still and removes material from the workpiece as it turns. These large machines are usually placed on a work floor with proper power, air supply, and coolant fluids. The parts are stored "inside" the machines. This means that the area for machining can sometimes be much smaller.

CNC machines are computer-controlled machines that can run a specific program and then work on the part being placed in their workspace. This market is constantly changing, with new models and axes being added, as well as ways to make the job easier. The CNC machines can now be equipped with pallet changers and tool changers, so the machine can be working on more than one part at a time.

A worker can fix a workpiece to a machine center by fixing it to a vise or other fixed object. The machining center controls the table where the workpiece is fixed in X and Z axes according the pre-input value. The spindle with the high-speed cutting tool is Z. The automatic machine of the workpiece is controlled by the feed in the direction. When the workpiece has been machinated, the worker releases it from the jig, attaches the new workpiece to another jig, and then repeats the process. The fixed position is crucial for precision machining. It must be installed on the correct point in the directions of the Z- and Y-axes. The workpiece must also be fast fixed at a fixed location even after the jig is attached to the workpiece.

SUMMARY

Systems and methods are disclosed to secure a workpiece with a recess or a projection on one end of the workpiece. The device includes a base; a body portion having a first end coupled to the base and a second end coupleable to the workpiece via the recess or the projection on one end the workpiece; and one or more fastener openings in the body portion, each fastener opening adapted to receive a fastener, each fastener opening further including a pivot module including a compression spring and a clamp pivot to secure the workpiece to the body portion.

Implementations can include one or more of the following. The dovetail body provides a mass that is fastened to a machine table with a dovetail shaped geometry that can accommodate a workpiece that has been prepared with a matching dovetail geometry. A clamp can secure the workpiece with an opposing dovetail angle. A clamping force generated from a screw and is distributed equally to the dovetail geometry on the workpiece pivot area on the dovetail body. The clamp pivot heel provides a radius on the clamp along with a matching radius cavity on the dovetail vise body, allowing the clamp to rotate to open when loosened and close when tightened. The compression spring provides pressure to the clamp, keeping it loaded and opens the clamp when the screw or actuator is released from pressure. This allows the workpiece to be removed from the workholding device. The base can couple to a numerically controlled CNC or a pallet system, which would allow for multiple workholding devices and workpieces to be delivered to the CNC machine sequentially providing automated operation. The base can be circular. The body portion can be substantially square-shaped tower with curved edges. A clamp can be secured to the workpiece with a 60-degree dovetail angle. The compression spring provides pressure to the clamp so that the clamp is loaded. A clamping force generated from a screw is distributed to an angle on the clamp by pushing against a pivot area. The clamp pivot provides a radius on the clamp along with a matching radius on the dovetail vise body. This allows the clamp to rotate to open when loosened and closed when tightened. The body portion can be a sixty-degree dovetail. The base couples to a numerically controlled system or to a pallet system.

Advantages of the device may include one or more of the following. The device securely holds the workpiece for machining operations. The device can be used with robots and machine tools such as a CNC lathe. The device is capable of rapidly fixing a workpiece in an exact position. The system enables the machining center to control the feed from the fixed table to the workpiece according to the machining value pre-input on basis of the working position of the workpiece fixed to the table, or, it may control the machining by controlling the feed from the main shaft equipped with the cutting tool. The device reduces the time it takes to attach and remove the workpiece from the table at the machining center, thus greatly impacting productivity when used to fix the workpiece. Further, since the workpiece fixed to the upper portion of the tower can be fixed by fixing the position, angle and the like accurately by using the alignment portion, the fixation of the workpiece is made precise, the quality of the workpiece is improved. The system reduces the time to get the workpiece in the right position for a non-skilled worker. The system reduces the chance that the workpiece is improperly fixed, thus improving the processing accuracy of the workpiece, resulting in a large number of high quality workpieces. The system also improves rigidity and accuracy and enables robots to be used in precision material-removal applications, including deburring, deflashing, trimming, polishing, and grinding. Waterjet and laser-cutting processes are also being robotically controlled in material-removal applications, while robotic milling of softer materials, including foam, plastics, wood, sand castings, and aluminum. The system also enables the machine to apply multiple types of machining on different sides of a workpiece, without the need to prepare and replace the workpiece using the automatic changing device. The machine tool is able to carry out different operations such as milling, drilling, turning and/or electrical discharge machining, etc. In this context, the expression "milling machine" is therefore to be given a wide interpretation, i.e. it relates to machine tools that are not only able to carry out milling operations but if need be can also carry out turning, drilling, electrical discharge machining, grinding, among others.

BRIEF DESCRIPTION OF THE DRAWINGS

The invention is to be explained in more detail below with reference to exemplary embodiments and in connection with the figures. In the drawing:

FIG. 2 shows a detailed view of pivot module while

DESCRIPTION

Systems and methods are disclosed to secure a workpiece with a recess or a projection on one end of the workpiece. The device includes a base, a body portion with a first end coupled to the base and a second end coupleable to the workpiece via the recess or projection, and one or more fastener openings in the body portion. Each fastener opening is adapted to receive a fastener and includes a pivot module with a compression spring and a clamp pivot to secure the workpiece to the body portion.

Figure 1:
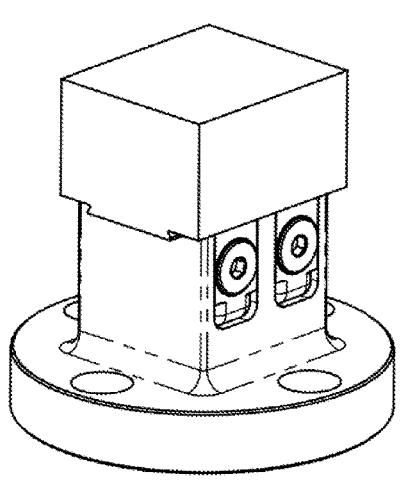
FIG. 1 shows an exemplary workpiece holder.
Figure 1:
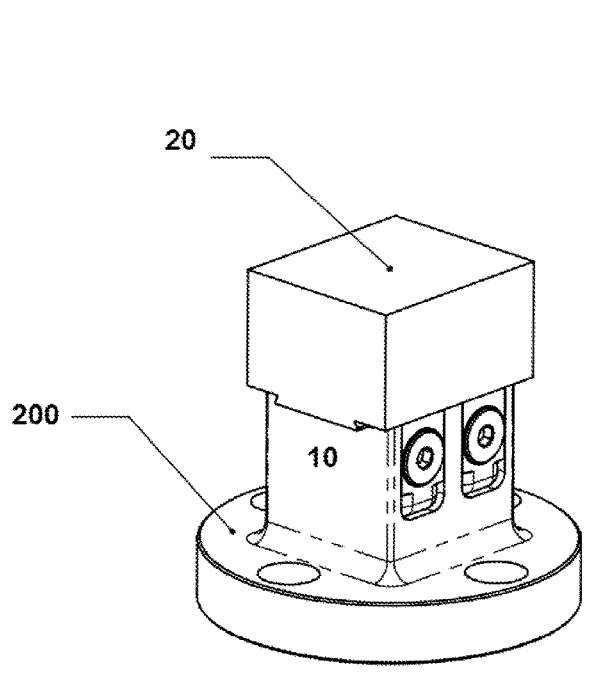

FIG. 1 shows an exemplary workpiece securing system. The system includes a dovetail body 200 that can be fastened to a CNC machine table, and includes a dovetail shaped recess geometry to receive the workpiece. A workpiece 20, prepared with a corresponding mating protrusion at the bottom engages the recess to secure the workpiece to the dovetail body. In one embodiment, a dovetail at the top of the tower secures the workpiece. The system in FIG. 1 has two clamps that pivot into a closing position to clamp the workpiece to the dovetail body with the following exemplary components:

1. Base 200: In one embodiment, a dovetail body that provides stability and attaches to the machining table or pallet system, featuring a dovetail geometry for engaging the workpiece.
2. Workpiece 20: The part being machined, which engages the tower via a dovetail or similar mechanism.
3. Pivot Module 100: Includes a compression spring 104 and a clamp pivot 130, enabling secure attachment and adjustment of the workpiece.
4. Compression Spring 104: Provides pressure to keep the clamp loaded, allowing easy loading and unloading of the workpiece.
5. Clamp Pivot 130: Distributes the clamping force and allows the clamp to rotate for secure engagement.

Figure 2:
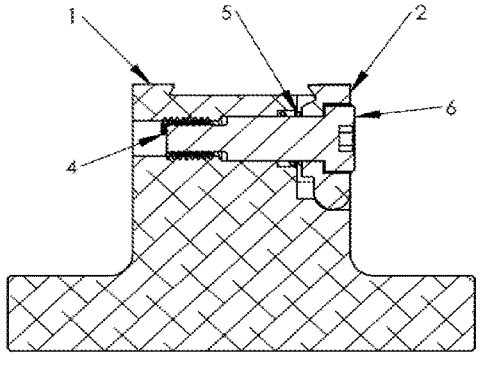
Figure 2:
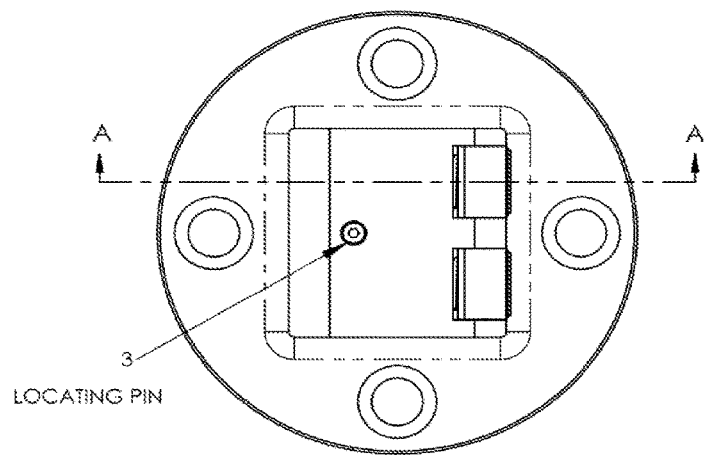
Figure 2:
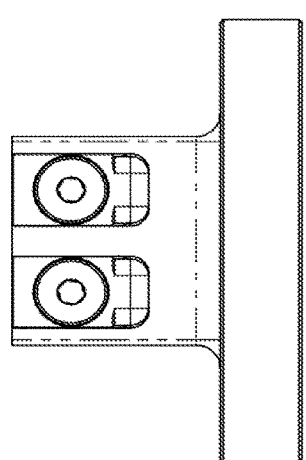
Figure 3:
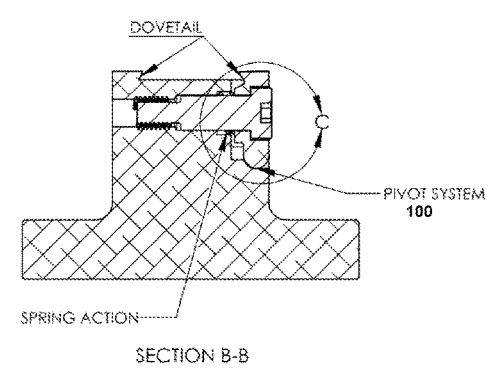
FIG. 3 shows the pivot module on a clamp.
Figure 3:
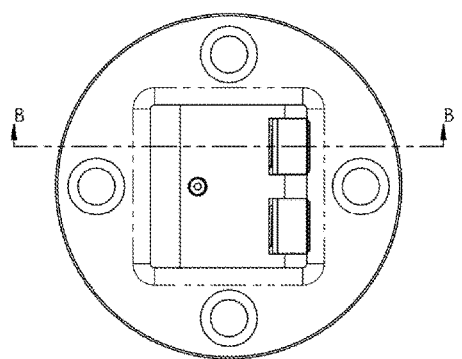
Figure 3:
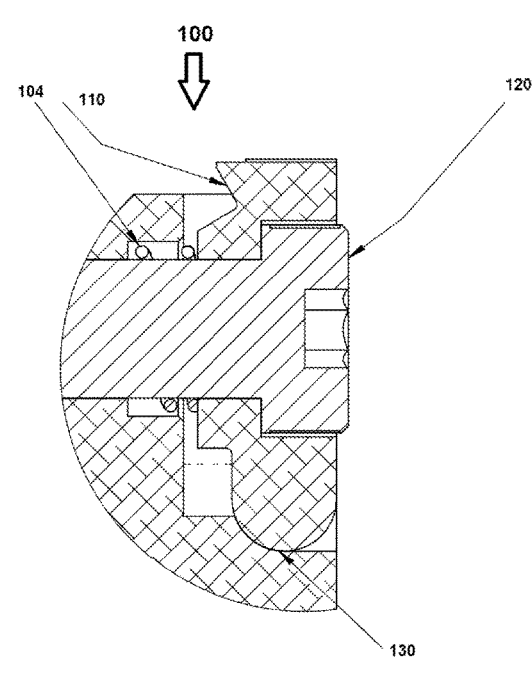

FIGS. 2-3 provide more details on the clamp, utilizing the pivot module 100. FIGS. 1-3 show a device to secure a workpiece with a projection on one end. The device includes a dovetail body 200, with a first end coupled to the base and a second end coupleable to the workpiece via the recess or projection. The body portion includes fastener openings to receive fasteners and cavity portions to receive the clamps and pivot geometry.

As shown in FIG. 2, each fastener opening receives a fastener through an opening. The fastener opening includes a pivot module 100 with a compression spring and a clamp pivot 130 to secure the workpiece to the body portion. FIG. 2 shows the dovetail workholding device in more details with a pivot system 6 that includes Dovetail Vise Body 1, Clamp 2, Screw 3, Spring 4, and Spring Action 5. The dovetail vise body 1 forms the main structure, the clamp 2 secures the workpiece, the screw 3 is part of the clamping mechanism, the spring 4 provides constant pressure, and the pivot system 6 allows the clamp to adjust to variations in workpiece geometry.

In more details, the base 200 is designed to be fastened to a CNC machine table. It features a dovetail-shaped recess geometry designed to receive and secure the workpiece 20. Between the base 200 and tower structure. The system includes two clamps that pivot into a closing position. These clamps are used to further secure the workpiece to the dovetail body.

The overall design of this system aims to provide a secure and precise method for holding workpieces during CNC machining operations. It allows for rapid fixation of the workpiece in an exact position, which is crucial for precision machining and improving productivity in automated manufacturing processes.

The embodiment of FIG. 2 uses a dovetail with a 60-degree angle on sides 1-2 to engage the bottom of the workpiece 20 which is angled at a corresponding 120 degree angle to slidably engage the dovetail at the top of the tower 10.

Turning now to FIG. 3, more details on the pivot module 100 and its impact on the clamp 110 are detailed. The pivot module 100 includes a compression spring 104 that provides pressure to the clamp 110 so that the clamp stays properly loaded at all times. This allows easy workpiece loading as it will release the clamp 100 from the workpiece when the screw is loosened.

The clamping force generated from a screw is distributed to the angle on the clamp 110 by pushing against a pivot area. The force is generated appropriate to the angle of the clamp 110 and the angle on the stock blank or workpiece 20. The force generated from the screw is distributed simultaneously to the workpiece 20 and the securing tower 20 of the (dovetail vise body). The clamp pivot 130 provides a radius on the clamp along with a matching radius on the dovetail vise body. This allows the clamp to rotate to open when loosened and closed when tightened.

During use, the following operations can be done:
1. Mounting: Secure the dovetail body to the milling table or pallet system.
2. Engaging the Workpiece: Align the workpiece with the dovetail on the tower and slide it into place.
3. Securing the Workpiece: Use fasteners to tighten the pivot module, which compresses the spring and engages the clamp pivot, ensuring secure attachment.
4. Machining: The workpiece remains fixed during machining operations, ensuring precision and stability.
5. Releasing the Workpiece: Loosen the fasteners to release the compression spring and pivot module, allowing the workpiece to be easily removed.

The system of FIGS. 1-3 can be used with CNC Machine Tools. The pallet is a movable & interchangeable part of a machine tool that helps to transport raw or finished parts from the machine to reduce downtime for part loading/ unloading. The system improves efficiency over manual pallet systems where the operator has to physically load and unload the pallet, with the raw/finished part, to/from a docking station located & mounted on top of the machine table. The robotic pallet system uses a robot to load and unload pallets. The robot is often able to serve one to multiple machines. When used with the device of FIG. 1-3, the automatic pallet changer offers the following benefits for CNC machining:

Improved machine usage through continuous machining processes. This reduces the duration for non-productive manufacturing, as the set-up can be done concurrent with the operation of the machine.

Vastly improve speed of changeover to a new part, completing it in a matter of seconds.

Simplify pallet changing to a mere push of a button or command on the CNC console.

Increase flexibility for a single machine to be deployed for multiple functions. You can machine the same part repeatedly, and set-up the machine to manufacture two different parts on the same pallet or define it to OP10 & OP20.

Allow for less operator-driven processes by changing pallets automatically via machine control.

Allow for the unmanned operation of the machine over a longer period of time (subject to individual cycle time for each part).

Minimize manual intervention and hence human errors.

Recover time lost to repeat setups for recurring part orders. This allows the production line to quickly begin work once a repeat order is received.

Adopt "High Mix-Low Volume" manufacturing methods.

Achieve better ROI for machine.

The overall shape which is in accordance with the intended use and which can be achieved with the method according to the invention involves any desired component which can be obtained from the workpiece or blank by the abovementioned operations. The blank is a blank made of metal or a ceramic material in the form of a rectangular or cylindrical or polyhedral, or parallelepiped-shaped, block or is a cast blank or forged blank. It is likewise possible to feed the blank to the method according to the invention in an already pre-machined form. The method according to the invention is also successful with such difficult-to-machine components, and this without loss of quality of the final shaped parts.

The exemplary embodiments described herein are not intended to be limiting. To those skilled in the art the benefits of the technology are apparent. Furthermore those skilled in the art will appreciate that the intent of this technology may be realized in other embodiments not necessarily described herein. Any methods disclosed herein includes one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the technology.

While specific embodiments and applications of the present technology have been illustrated and described, it is to be understood that the technology is not limited to the precise configuration and components disclosed herein. Various modifications, changes, and variations that will be apparent to those skilled in the art may be made in the arrangement, operation, and details of the methods and systems of the present technology disclosed herein without departing from the spirit and scope of the technology.

What is claimed is:

1. A method to secure a workpiece to a table or a platform, comprising:

providing a device having a base, a body portion having a first end coupled to the base and a second end coupleable to the workpiece via a recess or a projection on one end of the workpiece; and one or more fastener openings in the body portion, mounting the workpiece to the body portion with one or more fasteners, each of the fastener opening adapted to receive a fastener of the one or more fasteners, each of the one or more fastener openings further including a pivot module including a compression spring, and a clamp pivot to secure the workpiece to the body portion;

distributing a clamping force generated from a screw to a dovetail geometry on a workpiece pivot area on a dovetail vise body, wherein a clamp pivot heel provides a radius on a clamp along with a matching radius cavity on the dovetail vise body, allowing the clamp to rotate to open when loosened and close when tightened; and mounting the base to the table or the platform.

2. The method of claim 1, wherein the base is circular.

3. The method of claim 1, wherein the body portion is substantially square-shaped tower with curved edges.

4. The method of claim 1, comprising coupling the clamp to the workpiece with a 60-degree dovetail angle.

5. The method of claim 1, comprising providing pressure to the clamp so that the clamp is loaded.

6. The method of claim 1, comprising generating the clamping force from the screw and distributing the force to an angle on the clamp by pushing against the workpiece pivot area.

7. The method of claim 1, comprising forming the radius on the clamp along with the matching radius on the dovetail vise body and allowing the clamp to rotate to open when loosened and closed when tightened.

8. The method of claim 1, wherein the body portion comprises a sixty-degree dovetail.

9. The method of claim 1, wherein the base couples to a numerically controlled system.

10. The method of claim 1, wherein the base couples to a pallet system.

* * * * *